July 23, 1968     C. K. MacLEOD ETAL     3,393,500
GRASS CATCHING MEANS FOR ROTARY POWER MOWERS
Filed April 16, 1965     4 Sheets-Sheet 1

INVENTORS
CHARLES K. MacLEOD
PAUL O. RAWSON, JR.

ATTORNEYS

July 23, 1968  C. K. MacLEOD ETAL  3,393,500

GRASS CATCHING MEANS FOR ROTARY POWER MOWERS

Filed April 16, 1965  4 Sheets-Sheet 3

INVENTORS
CHARLES K. MacLEOD
PAUL O. RAWSON, JR.

BY

ATTORNEYS

July 23, 1968

C. K. MacLEOD ETAL 3,393,500

GRASS CATCHING MEANS FOR ROTARY POWER MOWERS

Filed April 16, 1965

INVENTORS
CHARLES K. MacLEOD
PAUL O. RAWSON, JR.

BY

ATTORNEYS

United States Patent Office 3,393,500
Patented July 23, 1968

3,393,500
GRASS CATCHING MEANS FOR ROTARY
POWER MOWERS
Charles K. MacLeod, Montclair, N.J., and Paul O. Rawson, Jr., Trumbull, Conn., assignors by direct and mesne assignments, to J. C. Penney Company, Inc., a corporation of Delaware
Filed Apr. 16, 1965, Ser. No. 448,721
2 Claims. (Cl. 56—202)

ABSTRACT OF THE DISCLOSURE

An improved grass bag and power mower connector assembly combination for releasably attaching a grass catching bag to a rotary power mower, comprising a grass discharge outlet means connected to the mower housing, flange guide members extending laterally outward from two opposite side edges of said outlet means adjacent said outlet opening, and a unitary structure slide connector having a frame portion defining an inlet opening, a peripherally opening channel in said frame and slide members extending laterally outward from two opposite sides of said connector.

---

This invention relates to improvements in grass catching means fro rotary power mowers, and more particularly, it relates to a slide connector assembly for releasably attaching a grass catching bag to a rotary lawn mower, and to an improved grass bag in combination therewith.

Rotary power mowers are usually constructed with a single discharge outlet opening laterally out of one side of the housing that encapsulates the blades. In attaching a grass catching bag to a rotary power mower, the inlet end of the bag is simply aligned with the outlet from the mower and releasably attached to the outlet in a way that will permit ease of removal for emptying. The standard manner of attaching the bag to the outlet has been by means of a drawstring provided at the inlet end of the bag. Although, the drawstring attachment would seem to be satisfactory in spite of the inconvenience of tying and untying, in fact it is most undesirable because of the need for the operator to put his hands so close to the rotating blade. Even when the mower is equipped with a deflector assembly which is selectively attachable to the side of the discharge outlet to direct the discharge toward the back of the mower where the operator stands, the ultimate mower discharge outlet defined by the deflector assembly is still close to the rotary blades to insure safety. Therefore, to increase safety and facilitate attaching and detaching of the bag to and from the mower, various types of frames and clamping arrangements have been devised. The present invention provides an improved means of attaching grass bags to rotary lawn mowers.

Broadly stated, the invention relates to a connector assembly for releasably attaching a grass catching bag to a rotary lawn mower to receive the cut grass as it is discharged from the housing of the power mower. The assembly comprises the combination of a discharge outlet which opens out of the housing through which cut grass is discharged and guides mounted adjacent the discharge outlet. A slide connector is provided which has a portion defining an inlet opening and forming the inlet end of a grass catching bag to hold it about the inlet opening, and slide means are on said connector for slidably engaging the guides to guide the connector into fixed alignment with the discharge outlet whereby connector can be slidably attached to the power mower to align the bag inlet with the discharge outlet to receive the cut grass. The connector assembly is preferably designed to slide vertically on the mower outlet and can be provided with a vertically extending handle; the slide connector offers additional advantage if made of a simple unitary structure.

In combination with this connector assembly there is also provided unique means for attaching the end of the bag opposite to the inlet end to the housing and means for emptying the contents from this opposite end. Attachment of the grass bag with the improved connector assembly of the invention gives facility of attachment coupled with safety of use not heretofore possible. No clamping or difficult aligning of interfitting parts is required, instead in its preferred form, a simple vertical sliding movement is all that is required securely to attach the inlet end of the bag to the mower outlet. This can be effected with one hand and it is unnecessary that the operator endanger himself by putting his hands near the rotating blade. Also by manufacturing the slide connector as a unitary structure with a frame portion comparable in size to the mower outlet, good alignment and substantially flush abutting contact is effected therebetween.

Preferred embodiments of the invention are described hereinbelow with reference to the drawings wherein.

Figure 1:
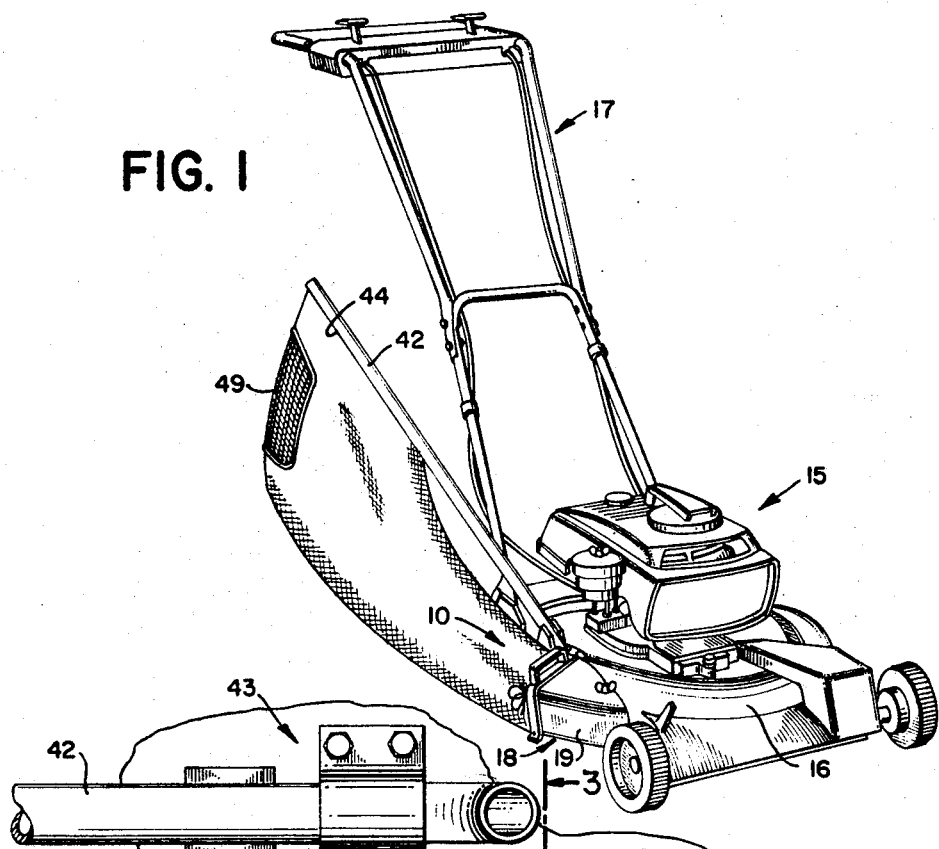
FIG. 1 is a perspective of a rotary power mower with a grass catching bag attached thereto in the manner of the invention.
Figure 2:
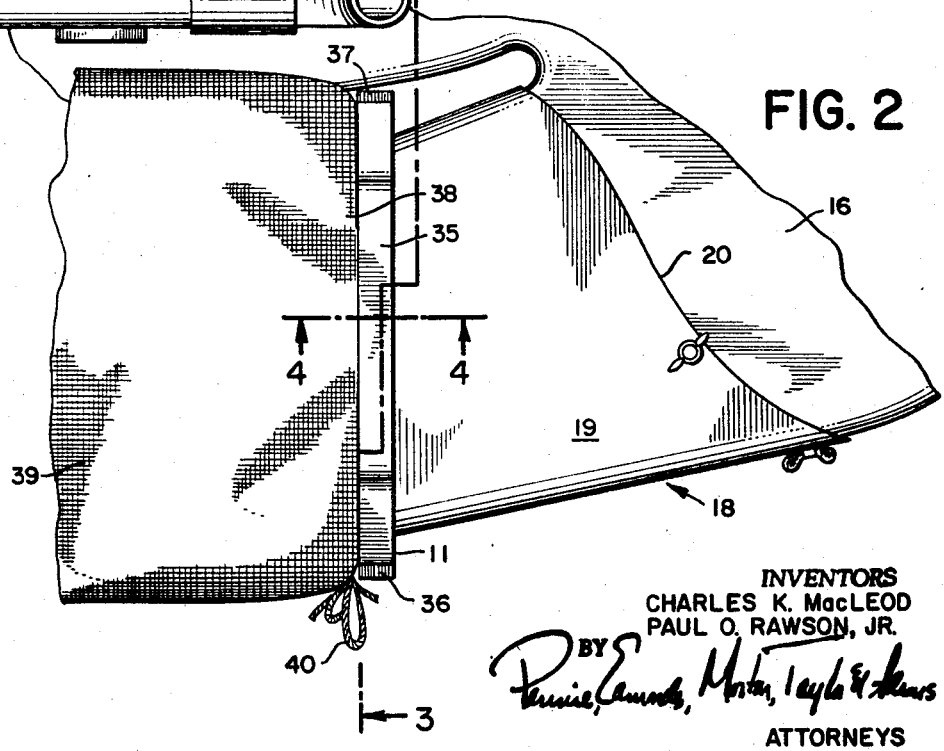
FIG. 2 is a fragmentary top view of the connector assembly.
Figure 3:
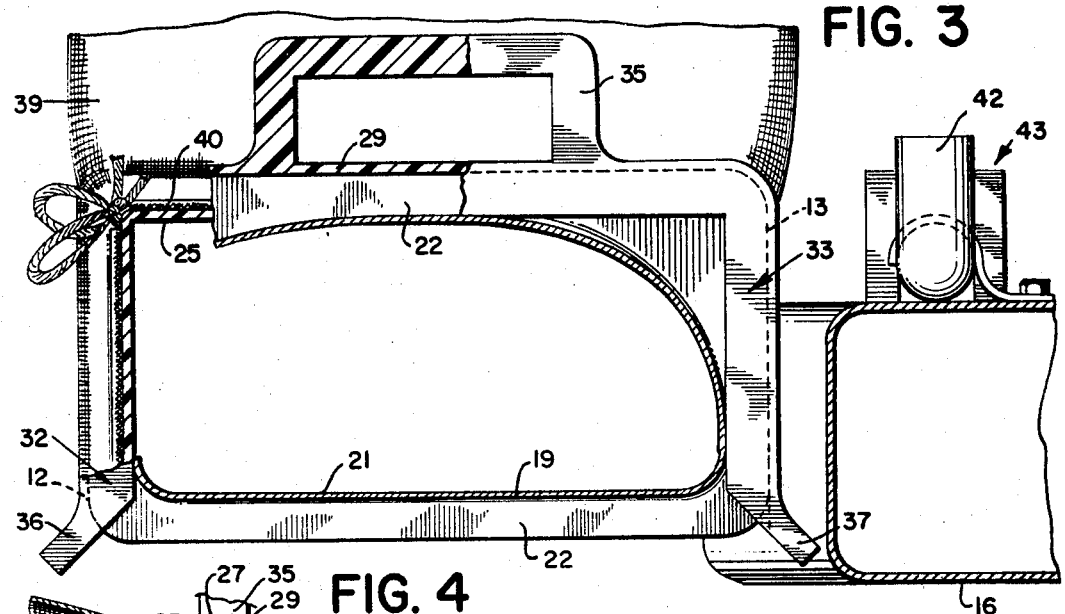
FIG. 3 is a section of the connector assembly taken along the lines 3—3 of FIG. 2.
Figure 4:
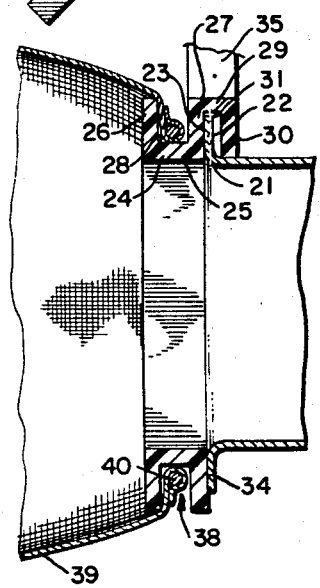
FIG. 4 is a section of the connector assembly taken along lines 4—4 of FIG. 2.

Referring intially to FIGS. 1–5, a first connector assembly 10 is clearly shown. The connector assembly is basically comprised of a slide connector 11 and flange guide members 12 and 13 which extend laterally outward from opposite sides of an outlet from the mower through which the cuttings are discharged. As shown in FIG. 1, the connector assembly is used with a rotary power mower 15 which has a housing 16 enclosing the rotary blades and a handle 17 extending from the back of the mower. Attached to one side of the housing is a deflector assembly 18 consisting of a curved deflector chute 19 which is attached to the side discharge outlet 20 of the housing. This chute 19 and manner of attachment to the housing are of standard construction; the effect of the chute is to extend the actual mower outlet to a position facing rearwardly generally toward the operator rather than laterally. An outlet 21 is thereby provided to which the inlet end of a grass bag will be attached so that the bag extends generally rearwardly rather than laterally. Although this outlet is defined by the deflector assembly, the connector assembly can be attached to an outlet formed directly on the housing as well.

According to the invention, at the outlet end of the chute, which effectively defines the mower outlet, there is a radially outwardly extending flange 22. In this embodiment the flange extends outwardly from all sides of the outlet opening. The flange thereby provides the flange guide members 12 and 13 extending vertically along the sides of the outlet into which the slide connector is slidably attached. The flange formed in this manner also provides a flat marginal flange surface 23 framing the periphery of the outlet opening.

The slide connector 10 is comprised of a unitary molded plastic member and consists of a substantially rectangular frame portion 24 which defines an inlet opening 25 of nearly the same size as the outlet 21. The frame is substantially U-shaped in cross-section with spaced radially outward extending rims 26 and 27 defining a channel 28 opening peripherally around the frame portion. Extending axially from the outermost end portion of one of said rims is an intermediate portion 29. This intermediate portion extends from the top and two sides of the frame as depicted in the drawings. Extending radially inwardly from the end of the intermediate portion is an end flange 30. The intermediate portion and the end flange do not extend from the bottom portion of the frame, and thus, there is defined an inverted U-shaped portion which defines an inwardly opening channel 31 which is adapted to slidably fit vertically onto the flange 22. The sides of this inverted U-shaped portion define a pair of slide fasteners 32 and 33 which are slidable on the flange guide members 12 and 13. The flange 22 at the top seats in the base of the inverted channel and serves both to align the slide connector in relation to the outlet by limiting the distance it can slide and contributes to preventing longitudinal displacement of the slide connector from the outlet. It is also to be noted that a flat marginal rim surface 34, from which the intermediate portion extends, is defined on the rim 27 so that when the slide connector is slidably attached to the outlet assembly, there can be substantially surface-to-surface abutting contact with the flange.

Extending vertically from the top of the intermediate portion is an integral handle 35. Also positioned at the intermediate portion and end flange at the open end of the inverted U-shaped channel are outwardly flared ends 36 and 37 which aid in aligning the slide connector on the flange guide members 12 and 13.

As shown, an inlet end 38 of a grass catching bag 39 is attached to the slide connector by tying drawstrings 40 contained in the marginal inlet end of the bag to hold it in the frame channel 28. Once attached in this manner the inlet opening of the frame effectively defines the inlet into the grass catching bag. The attachment of the slide connector to the outlet is easily effected by vertically sliding the slide connector into the flange 22 of the outlet where it is retained perfectly aligned and resistant to detachment.

Figure 6:
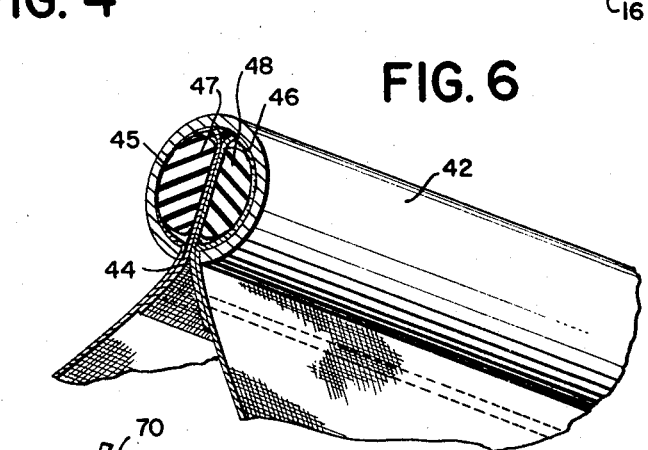
FIG. 6 is a fragmentary perspective of means for supporting the outlet end of the bag shown in FIG. 1.
Figure 10:
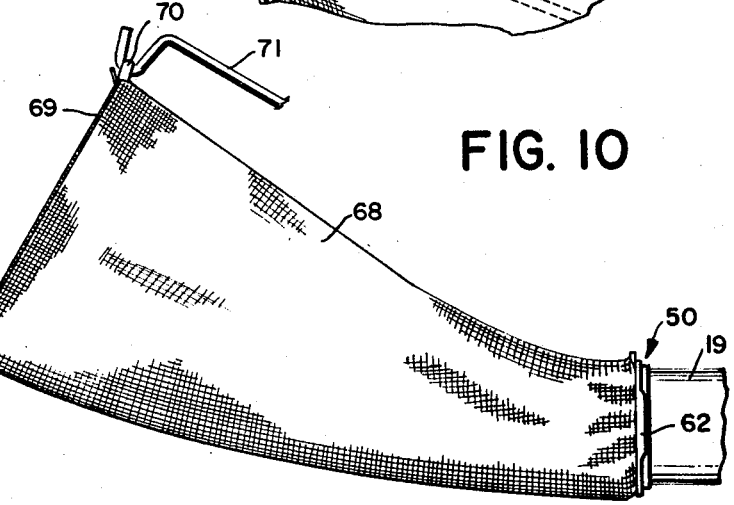
FIG. 10 is a side elevation of a bag and bag attachment to which the second connector assembly is attached.
Figure 5:
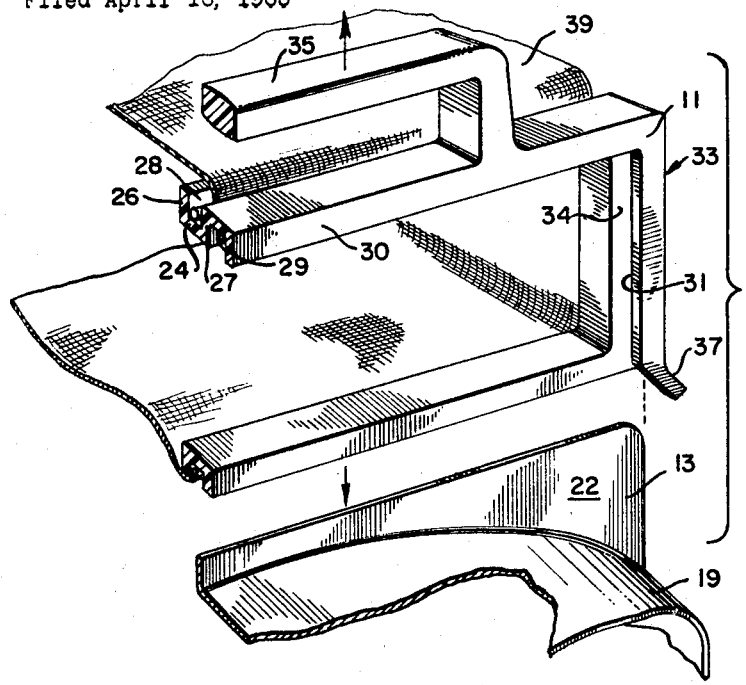
FIG. 5 is a perspective of the slide connector of the connector assembly being inserted on the mower outlet.

In the first embodiment the bag is mounted on a tubular supporting arm 42. The tubular supporting arm consists of a rigid tubular member which has one end securely held in a clamping device 43 and the opposite end has an elongated split extending along an end length of the tubular member. The bag is of a unique construction in that its discharge opening 44 is defined along a length of the bag rather than on the end as is usually the case. As shown in FIG. 6 the outlet is defined by enlarged lips 45 and 46 which are formed by folding the respective marginal end portions of the bag about elongated rubber beads 47 and 48 so that when the two lips formed in this way are positioned together they can be slid into the tubular member to hold the lips together in a closed position and to support the bag in its extended position as shown in FIG. 1; the combined thickness of the enlarged lips 45 and 46 is sufficient to prevent displacement out of the elongated slit. It is to be noted that there is a porous panel 49 at the back end of the bag to provide an exit for the air being forced through the bag.

By this construction when the bag is full it is emptied by vertically lifting the slide connector from the flanged outlet and sliding the lips out of the tubular arm and then emptying the cuttings from the bag through the outlet defined by the lips.

Figure 9:
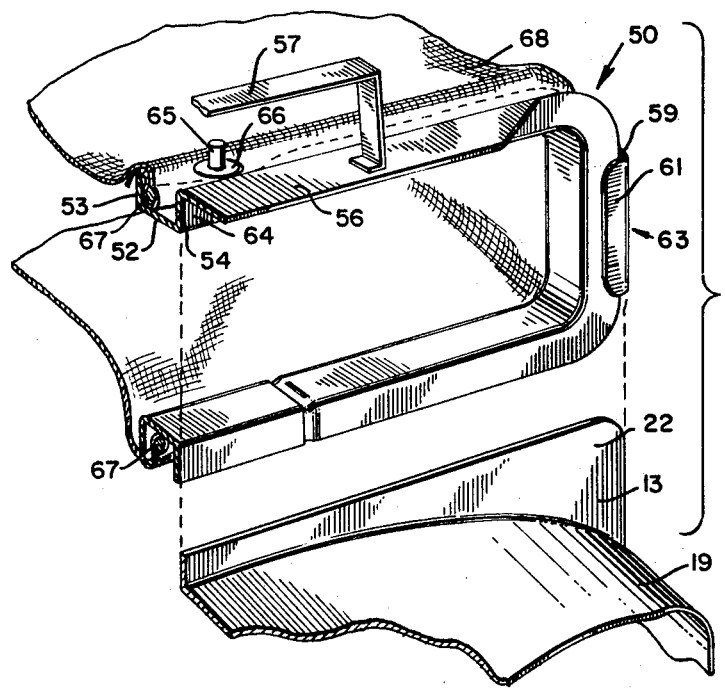
FIG. 9 is a perspective of the slide connector of the second connector assembly being inserted on the mower outlet.
Figure 8:
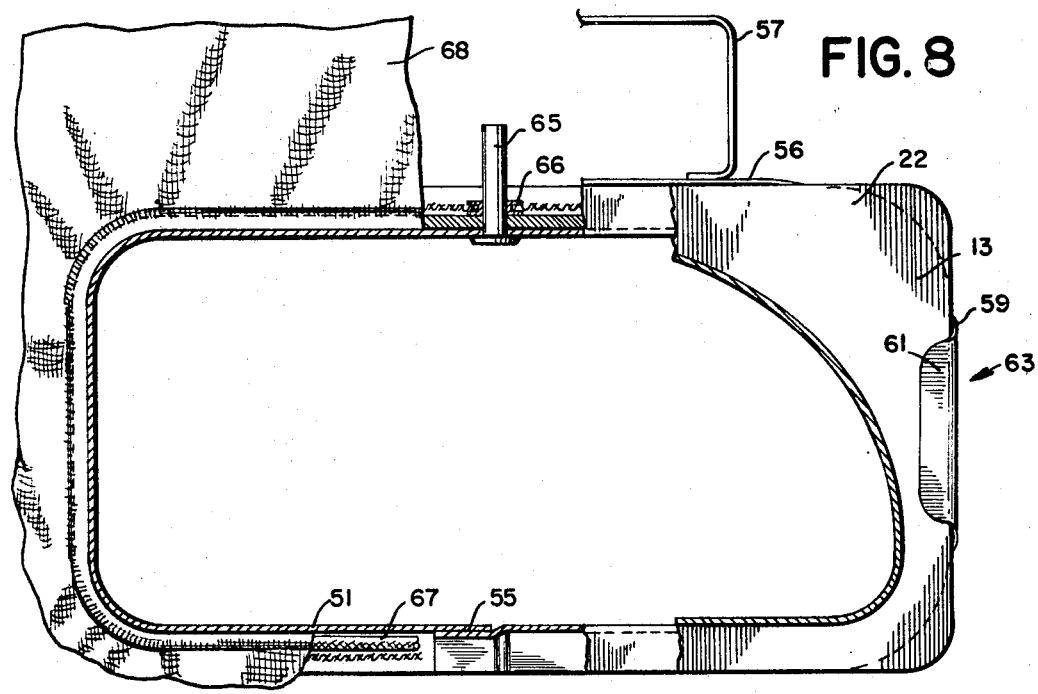
FIG. 8 is a section of the second connector assembly taken along lines 8—8 of FIG. 7.
Figure 7:
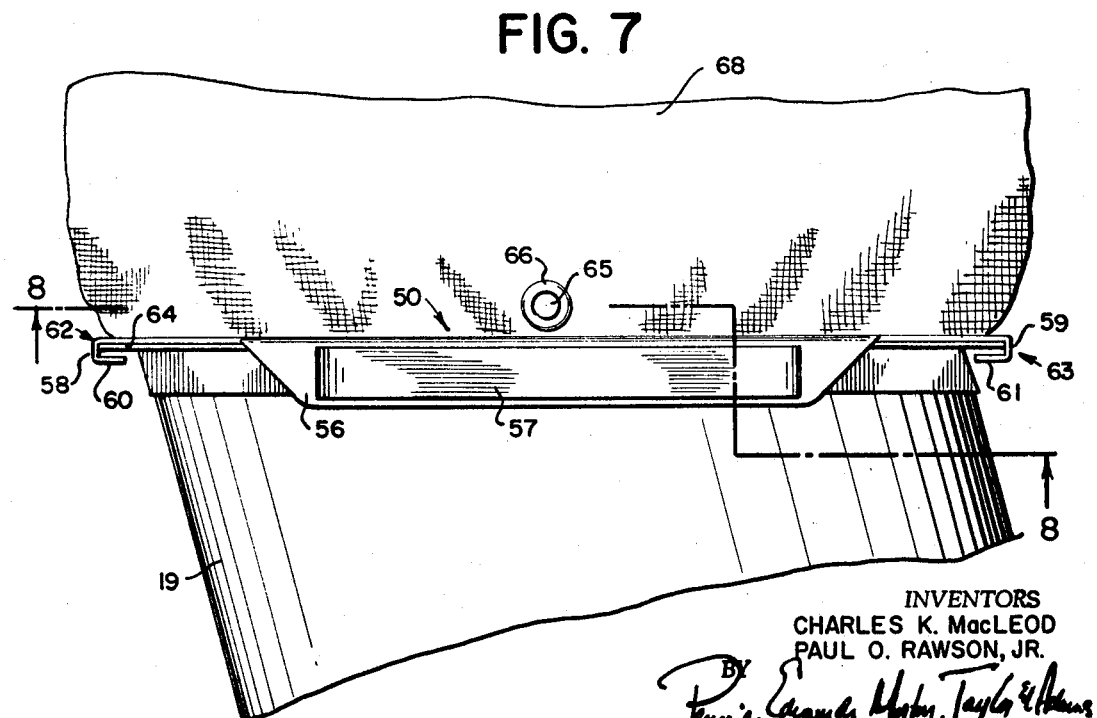
FIG. 7 is a fragmentary top view of a second embodiment of a connector assembly.

A second embodiment is shown in FIGS. 7–10. The discharge outlet assembly from the rotary mower is identical to that described in relation to the first emodiment. The slide connector 50 is also a unitary structure but is modified somewhat and as shown in FIG. 9, it is formed from an elongated metal strip 51 which has been folded to define a construction very similar to the first embodiment. It has a frame portion 52, generally rectangular in shape which has a substantially U-shaped cross-section defined in part by a pair of spaced radially outward extending rims 53 and 54. This channel serves the same function as the frame channel in the first embodiment in that inlet end of a bag will be located in the channel and attached therein. The elongated strip which is folded into the rectangular shape described has a lap seam 55 at the bottom of the slide connector where the marginal end portions of the strip are attached. Extending axially from one rim is a top flange portion 56 on which is mounted a vertically extending handle 57 and extending axially from the same rim along the respective opposite vertical sides of the slide connector are intermediate axially extending portions 58 and 59 which are inwardly bent to form inwardly extending flange portions 60 and 61. These side extensions serve to define elongated slide fasteners 62 and 63 which are slidable onto the flange for the purpose of connecting the slide connector onto the flange of the discharge outlet. As in the first embodiment, the rim 54 also defines a flat surface 64, from which the intermediate and top portions extend, which frames the periphery of the inlet of the frame portion and in its assembled position is in substantial surface-to-surface contact with the corresponding flat surface defined by the flange at the outlet of the discharge opening.

A pin 65 extends through the frame portion vertically out of the channel along the top portion of the slide connector. The purpose of this pin is to align a grommet 66 which is provided at the inlet end of the grass catching bag so that the bag will be properly positioned on the slide connector. In this embodiment rather than having drawstrings to tie the inlet end of the bag on the slide connector, an elastic band 67 is provided in the marginal end portion to serve an equivalent purpose.

The bag construction is different in this embodiment. It is essentially a porous bag 68 which has a zippered outlet 69 in the endmost portion of the bag and has a loop 70 at the top end of the bag which is designed to hook onto a standard arm 71 of the type presently being used to support bags of this type.

Although, the slide connector of the second embodiment differs somewhat in its method of fabrication, the essential elements to provide a vertical slide attachment are the same, and it is functionally equivalent.

We claim:

1. A grass bag mounting assembly for releasably attaching a grass catching bag to a rotary power mower to receive cut grass as it is discharged from the power mower comprising:
   (a) a discharge outlet opening out of said mower through which cut grass is discharged,
   (b) guides mounted adjacent said discharge outlet,
   (c) a grass catching bag having an inlet end operatively connected to said discharge outlet and an outlet end through which the cuttings can be emptied,
   (d) a slide connector having a portion defining an inlet opening, said portion formed to receive the inlet end of said grass catching bag to hold it about the inlet opening, and slide means on said connector for slidably engaging said guides to guide the connector into fixed alignment with said discharge outlet, whereby said connector can be slidably attached to the power mower to align the bag inlet with the discharge outlet to receive the cut grass, (e) a tubular supporting rod mounted on said mower and extending therefrom in position to support the outlet end of said bag, said supporting rod having an elongated slit extending from the extended end of the rod along a substantial length of the rod, said outlet end of the bag defined by enlarged lips which slidably fit into the end of the tubular rod when closed with the combined thickness being sufficient to prevent displacement out of the elongated slit.

2. A grass bag connector assembly in combination with a rotary power mower for releasably attaching a grass catching bag to the power mower to receive cut grass as it is discharged comprising:
(a) a discharge outlet opening out of said mower through which cut grass is discharged,
(b) flange guide members extending laterally outward from the side edges of said outlet adjacent said outlet opening,
(c) a unitary structure slide connector having a frame portion defining an inlet opening, a peripherally opening channel in said frame portion for receiving the inlet end of a grass catching bag about the inlet opening, a substantially flat surface defined on one face of said frame portion and substantially framing said opening, a pair of slide fasteners extending outwardly substantially perpendicular to said flat surface at least along the opposite vertical sides thereof with their end portions extending inwardly to define a pair of vertical channels in the end flanges so that said fasteners are slidable on said guide members to guide said connector into fixed alignment with said discharge outlet with said flat surface in opposed surface-to-surface relation with said flange guide member, and a handle extending from the top of said connector whereby said connector can be slidably attached by vertically sliding the connector on the flange guide members to align the bag inlet with the discharge outlet to receive the cut grass.

References Cited
UNITED STATES PATENTS

| | | | |
|---|---|---|---|
| 160,700 | 3/1875 | Painter | 285—325 |
| 1,513,395 | 10/1924 | Holmes. | |
| 2,870,863 | 1/1959 | Bramhall | 285—325 X |
| 3,112,597 | 12/1963 | Heth et al. | 56—194 X |
| 3,246,459 | 4/1966 | Goldberg et al. | 56—202 |

ABRAHAM G. STONE, *Primary Examiner.*

P. A. RAZZANO, *Assistant Examiner.*